(12) United States Patent
Marcais (10) Patent No.: US 9,732,985 B2
(45) Date of Patent: Aug. 15, 2017

(54) TILED ROOF OF STANDARD APPEARANCE COMPRISING A SOLAR RADIATION HEAT RECOVERY DEVICE INVISIBLE FROM THE OUTSIDE

(71) Applicant: Frederic Marcais, L'Hay-les-Roses (FR)

(72) Inventor: Frederic Marcais, L'Hay-les-Roses (FR)

(*) Notice: Subject to any disclaimer, the term of this patent is extended or adjusted under 35 U.S.C. 154(b) by 442 days.

(21) Appl. No.: 14/402,307

(22) PCT Filed: May 17, 2013

(86) PCT No.: PCT/FR2013/000129
§ 371 (c)(1),
(2) Date: Nov. 19, 2014

(87) PCT Pub. No.: WO2013/175081
PCT Pub. Date: Nov. 28, 2013

(65) Prior Publication Data
US 2015/0144298 A1 May 28, 2015

(30) Foreign Application Priority Data
May 22, 2012 (FR) ...................................... 12 01440

(51) Int. Cl.
*F24J 2/42* (2006.01)
*F24J 2/52* (2006.01)
(Continued)

(52) U.S. Cl.
CPC ............. *F24J 2/0455* (2013.01); *F24J 2/045* (2013.01); *F24J 2/5245* (2013.01); *F24J 2/5252* (2013.01);
(Continued)

(58) Field of Classification Search
CPC F24J 2/0455; F24J 2/045; F24J 2/5245; F24J 2/5252; F24J 2002/4665;
(Continued)

(56) References Cited

U.S. PATENT DOCUMENTS

| 4,172,444 A * | 10/1979 | Atkinson | F24J 2/26 126/660 |
| 2011/0260027 A1* | 10/2011 | Farnham, Jr. | F24J 2/5207 248/309.1 |
| 2015/0171785 A1* | 6/2015 | Dickey | F24J 2/5245 248/346.03 |

FOREIGN PATENT DOCUMENTS

| DE | 202007008709 U1 | 11/2007 |
| FR | 2935172 A1 | 2/2010 |

(Continued)

*Primary Examiner* — Gregory Huson
*Assistant Examiner* — Daniel E Namay
(74) *Attorney, Agent, or Firm* — Baker & Hostetler LLP (57) ABSTRACT

A roof comprises a solar radiation heat recovery device that is invisible from the outside. The roof is made up of supports receiving a heat transfer network which has a longitudinal groove designed to receive the male profile of the protrusion of the heat recovery modules. The supports comprise arms which exert a lateral pressure on the flexible network. The resilient deformation of the network permits the sliding thereof between the arms to the clamped position. The groove of the network closes around the protrusion, immobilizing the module and holding the assembly in the support fixed to the roof frame. The roof is particularly intended to recover solar radiation heat in a way that is aesthetically pleasing, economical, simple and easy to install.

6 Claims, 3 Drawing Sheets

(51) Int. Cl.
*F24J 2/04* (2006.01)
*F24J 2/46* (2006.01)

(52) U.S. Cl.
CPC .. *F24J 2002/467* (2013.01); *F24J 2002/4665* (2013.01); *F24J 2002/4672* (2013.01); *Y02B 10/20* (2013.01); *Y02E 10/44* (2013.01); *Y02E 10/47* (2013.01)

(58) Field of Classification Search
CPC .. F24J 2002/467; F24J 2002/4672; F24J 2/42; F24J 2/52; Y02B 10/20; Y02E 10/44; Y02E 10/47
USPC .......................................... 126/622, 621, 623
See application file for complete search history.

(56) References Cited

FOREIGN PATENT DOCUMENTS

| | | | |
|---|---|---|---|
| FR | 2966228 A1 | 4/2012 | |
| IT | EP 0005753 A1 * | 12/1979 | ............... F24J 2/045 |
| JP | S55-10079 U | 1/1980 | |
| JP | 2005-290933 A | 10/2005 | |
| JP | 2006-010265 A | 1/2006 | |
| WO | 2008155012 A1 | 12/2008 | |

\* cited by examiner

TILED ROOF OF STANDARD APPEARANCE COMPRISING A SOLAR RADIATION HEAT RECOVERY DEVICE INVISIBLE FROM THE OUTSIDE

CROSS-REFERENCE TO RELATED APPLICATIONS

This application is a National Stage of International patent application PCT/FR2013/000129, filed on May 17, 2013, which claims priority to foreign French patent application No. FR 1201440, filed on May 22, 2012, the disclosures of which are incorporated by reference in their entirety.

FIELD OF THE INVENTION

The present invention relates to a tiled roof of standard appearance comprising a solar radiation heat recovery device invisible from the outside.

A series of roof modules of novel design absorbs the solar radiation and returns the stored heat to a specific heat transfer network positioned on a dedicated support fixed to the roof frame.

BACKGROUND

The recovery of heat from solar radiation is usually carried out by thermal solar panels which convert the solar radiation into heat.

These panels consist of a frame having a planar or tubular sensor designed to reheat the heat transfer fluid.

These panels have drawbacks.

More specifically, said panels require the use of metal materials and the production of a heavy frame which is costly to produce.

The panels weigh down the roof, causing repairs to the seal of the roof, the delicate operation thereof potentially causing leakages.

Moreover, it is questionable whether said solar panel systems have an attractive appearance on roofs.

In many instances, town planning regulations make the installation thereof impossible. This is the case, in particular, in the vicinity of buildings registered as historic monuments.

More discrete recovery systems have been created in order to respond to the aesthetic requirements of buildings.

Some systems comprise recovery devices which are located on the underside of the roof and which use metal elements connected to the heat transfer network.

The roof elements thus behave in the manner of an external facing, the appearance thereof being preserved.

The major drawback is the creation of an additional part to produce the connection between the roof and the heat transfer network which increases the complexity of the installation and creates additional material, increasing the cost and environmental impact. The amount of grey energy is substantially increased.

Recovery systems made of synthetic materials have also been created and reproduce the appearance of traditional materials. Said systems use synthetic materials as absorbers and have drawbacks relating to the duration of the service life of the panels, the recycling of products and the use of products derived from the chemical or petroleum industry for their production.

Further systems use air as the heat transfer medium.

Air naturally rises underneath roofs as a result of heating. The roof elements transmit their heat to the air.

This system has further drawbacks: it is difficult to exploit this heat. More specifically, to utilize this hot air and to distribute this heat to the user, it is necessary to use an air circulation system which is bulky and costly or to add air/water heat exchangers for the use thereof as primary fluid. For example, this might be for the preparation of domestic hot water.

SUMMARY OF THE INVENTION

The system proposed by the invention enables these different drawbacks to be remedied.

The roof and the elements which constitute said roof transmit the heat directly to a network in which a heat transfer fluid circulates.

There is no interface between said elements and the roof modules which constitute the appearance of the roof and the network.

The roof preserves a traditional appearance without it being possible to detect the use of a heat recovery device.

The prior art shows that a solution exists which is compatible with these technical considerations.

Reference is made to my patent number 2 935 172 FR: a system for heat recovery modules which enables heat to be transmitted to a heat transfer network.

This system has drawbacks, in particular relating to the quality of contact between the network and the modules.

Above all, the use of pins which ensure the contact between the modules and the network is not able to be implemented by casting and makes their installation before firing, carried out using casting slip, difficult and costly.

My improvement patent has been published under the number FR 2 966 228 to enable greater contact to be ensured between the tile and its heat transfer network.

This system largely remedies the drawbacks of poor contact between the module and the heat transfer network and also permits pantiles to be used.

However, there are still drawbacks.

Whilst the installation of individual modules with this system is efficient, the lateral covering of the tiles occasionally prevents effective engagement with their support. This difficulty is present, in particular, on mechanical interlocking tiles. This imperfect engagement results in a gap between the protrusion of the module and the network which impairs effective heat transmission.

On the other hand, hanging the tile by a specific area onto the support requires a costly alteration in order to modify the protrusion below on the tiles.

Whilst a simple anchoring of the tile on its support is sufficient, the tiles become detached due to the mechanical stresses caused principally by bad weather and expansion. More specifically, the network exerts a pressure which promotes the removal of the tiles from their support.

In this case, the module is no longer pushed onto its support correctly and leaves an air gap between the tube and the protrusion located below the module.

In spite of a close proximity, the thermal conduction no longer takes place efficiently due to this gap filled with air.

More specifically, the heat recovery makes it possible to improve output if there is close contact between the tile and its network.

The object of the roof according to the invention is to implement the capture of heat from solar radiation by remedying these drawbacks.

It consists in producing a roof of traditional appearance by installing a heat recovery system which is invisible to the outside. This invention makes it possible to resolve various difficulties encountered during the use of the aforementioned techniques. It also makes it possible to increase the exchange surface between the modules and the heat transfer network.

The modules of novel design which absorb the solar radiation comprise a male protrusion designed to be inserted into the heat transfer network.

The heat transfer network has an aperture designed to receive the protrusion of the heat recovery module.

More specifically, the network comprises a longitudinal groove having a shape which is identical to the protruding part of the protrusion of the heat recovery modules. This groove is continuous over the entire network designed for thermal capture. The network is located on the underside of the assembly of the heat recovery modules.

There is one heat transfer network per roof, which avoids unnecessary joins and connections in parts which are difficult to access.

It is, however, possible to use a plurality of networks to separate the roof surfaces, to increase and reduce the useable surface for capture, etc.

Thus it will be considered that there are a plurality of roofs for heat recovery. By way of non-limiting example, it is possible to separate the roofs oriented to the east and to the west.

It is inside this cavity or longitudinal groove present in the network where the heat exchange is carried out with the roof modules.

This is the reason for the expression "in the heat transfer network", in contrast to peripheral heat recovery usually carried out on the heat transfer network, qualified by the term "external".

The longitudinal groove is located in the fluid flow of the network. The heat transfer network is not perforated and this longitudinal groove remains well insulated from the heat transfer fluid by its casing. In contrast to the usual tubular networks, the heat exchange thereof with the protrusion of the recovery module being carried out from outside, the network has an aperture which permits the insertion of the heat recovery protrusion into the interior thereof.

The female longitudinal opening or longitudinal groove located in the heat transfer network reproduces the male or protruding shape of the protrusion located below the heat recovery module.

The dimension of this longitudinal or receiver opening may be equivalent or similar to permit the protrusion of the module to be inserted correctly in the heat transfer network which has resilient characteristics.

The network is flexible, which permits the clamping of the groove about the male protruding part of the protrusion and the fixing of the modules to the support.

According to a variant of the invention, a complementary heat exchange may be carried out from outside of the network to improve the thermal transmission and the recovery output.

In this particularly advantageous case, the heat exchange takes place both by means of the groove denoted as the internal part of the network and the external perimeter of the tube denoted as the external part.

According to this variant, the protrusion of the heat recovery module comprises a lateral contact surface and bearing surface designed to improve the heat exchange between the modules and the network and to facilitate the distribution of the bearing pressure when the modules are pushed in.

In contrast to existing systems, the contact between the roof module and the network is ensured even when the module has been incorrectly pushed into the network. This is due to the protruding male part of the protrusion of the modules in contact in the groove of the network.

By the stress which it exerts on the network the support permits more specifically the clamping of the groove onto the protrusion of the modules and the contact with at least one lower part of the male protrusion.

A significant surface of the module remains in contact with the network when the tiles have been partially pushed in.

The heat received by the module is thus transmitted to the network in good conditions as a result of this contact.

The support exerts a lateral pressure on the tubular external part of the network. The network acts as a clamp on the protrusion of the module due to the lateral mechanical stress exerted by the support.

The network has to have flexible characteristics to permit the protrusion located below the tiles to be held in close contact and on the inside thereof.

The heat transfer network is produced in any material which has the characteristics of flexibility, capable of permitting the modification to its geometry by external stresses.

This characteristic is also required for the installation of the network on the roof.

The support is designed for fixing the network and the modules to the roof frame; it comprises a zone for tensioning the network by means of clamping faces located on the retaining arms.

A minimum of one support is necessary for producing the roof according to the invention.

This support consists of a base, positioned on the roof frame and fixed thereto by means of standard fixings such as nails, rivets, screws, etc. More specifically, the support comprises at least one area in the base designed for the passage of standard fixings toward the roof frame.

The base constitutes the part of the support attached to the roof frame.

Arms are located in the extension of the base. Said arms are designed to retain the heat transfer network.

The arms constitute part of the support and are located in mutual opposition. According to one particular embodiment the arms of the support may be provided with openings, having in profile view the appearance of notches, this variant not having been shown.

According to a further particular embodiment, the support (s) are integrated in a roof deck. This feature makes it possible to carry out the prefabrication of the roof elements in the factory.

In this last embodiment, the roof deck may be manufactured from a metal sheet capable of improving the characteristics for protection against bad weather. This characteristic will be particularly appreciated in mountainous regions to protect the roof frame from snow and leakages.

The arms may be either stationary or fixed, or flexible and permit an articulation, notably at the time of insertion of the heat transfer network into the support.

In the case of a fixed arm, the resilient compression of the heat transfer network permits its insertion and its final positioning in the support.

A sliding face located on the upper part of the arm permits the insertion of the tube, without damage, into its final position inside the support.

According to an important variant of the innovation, at least one of the arms of the support comprises a flexion zone designed to facilitate the insertion of the network by being deflected laterally at the time of its installation by the roofer.

The appropriate dimension of the arm permits its flexion and the deflection thereof during the insertion of the network.

Thus, according to this variant, the arm of the support is articulated and permits the deflection thereof at the moment when the network passes through.

According to one particular embodiment, it is not necessary for all of the arms to be articulated.

Figure 8:
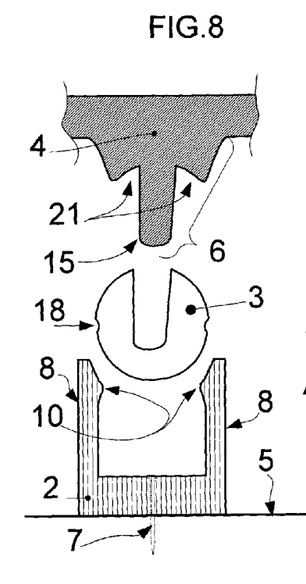
FIG. 8 illustrates a variant of the recovery device before mounting.
Figure 9:
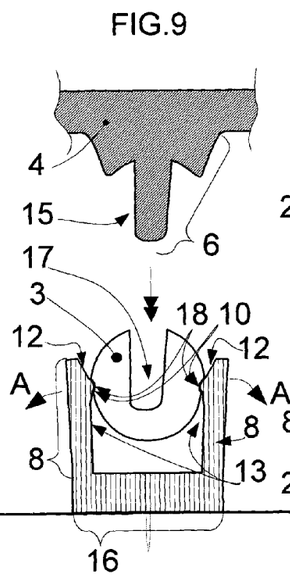
FIG. 9 shows the network held in its support during mounting.
Figure 10:
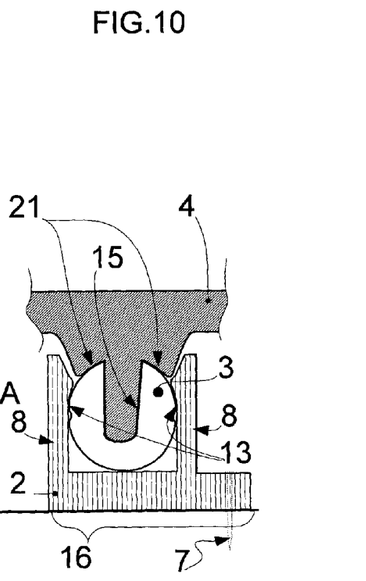
FIG. 10 shows the recovery assembly mounted.

To illustrate this particular embodiment, FIGS. 8 to 10 show two flexible arms in opposition, one single flexible side being sufficient to improve greatly the insertion of the heat transfer network.

In this last case, a fixed arm opposes the flexible arm.

This important characteristic makes it possible to simplify the implementation of the network and to limit its compression when put in place.

A zone of reduced thickness located in the lower part of the arms may facilitate the flexions thereof.

In all cases, the support comprises arms in mutual opposition, each incorporating two faces.

These two different faces are located on the arms to ensure the functions required for producing the roof:
  a sliding face which permits the passage of the network inside the support.
  a clamping face which constitutes a zone for tensioning the heat transfer network and permits the network to be held fixedly inside the support. Said clamping by tensioning of the heat transfer network ensures the fixing of the roof modules and the correct contact between the protrusion and the network.

These sliding and clamping faces may be located on the same plane. The sliding face is located on the upper part of the arm, whilst the clamping face is located on the lower part.

The sliding face corresponds to the surface which allows the network to pass, by sliding to its final or installed destination.

The clamping face corresponds to the surface in contact with the network which is installed or in the final position.

According to particular embodiments, the clamping face and sliding face are not located on the same plane but on two intersecting planes.

Thus to illustrate one particular embodiment, the wider sliding faces on the upper part of the arms will retract toward the lower part of the arms of the support. This is an advantageous feature which makes it possible to facilitate the installation of the network.

At the bottom, the clamping faces hold the network in the final position and avoid its removal by friction; the network is held in position in the support and the tile inside the groove of the heat transfer network.

The groove of the network closes around the protrusion, locking the module in position and holding the assembly in the support fixed to the roof frame by means of standard fixings.

More specifically, the heat transfer network fixes the tile by clamping the receiving space of the protrusion.

The spacing between the clamping faces located on the arms in mutual opposition of the support has a width which is less than that of the heat transfer network.

This is referred to as the width of the network, noting that it is not strictly tubular at this point. More specifically, the pressure exerted by the clamping faces modifies the shape thereof, even imperceptibly by slight compression.

The heat transfer network is held in the support by the friction of the clamping faces.

When the network is pushed in by the installer, the lateral pressure exerted by the clamping faces of the support located in opposition transmits a pressure to the network. Said pressure tightens the groove when applied onto the male protrusion located below the roof modules.

The network is closed around the protrusion in the manner of a clamp.

The stress exerted by the support on the network holds the roof module due to the friction exerted on the heat recovery protrusion.

The network thus closed around the protrusion of the roof modules is captively held by the arms of the support.

According to a particularly advantageous embodiment, the space between the clamping faces in contact with the tube is wider than that of the sliding faces. This feature makes it possible for the arms of the support to adopt a state close to the resting position after flexion and to counteract the removal of the network in a more effective manner.

Thus the support makes it possible to ensure the functions of fixing the roof modules and the network to the roof frame.

The resilient heat transfer network produces an interface between the roof module and the support.

The groove of the network forms a clamp.

This clamp is actuated by the lateral pressure exerted on the network due to the perimetric transmission of forces. The arms of the support exert this bearing force on the network.

The groove of the network is closed around the protrusion, locking the module in position and holding the assembly in the support fixed to the roof frame.

The assembly consisting of the support, the network and the recovery module is held fixedly once installed.

This feature is also particularly advantageous to avoid the detachment of tiles exposed to the wind.

As the solar radiation heat recovery is carried out on the underside of the modules, the roof produced has the appearance of an ordinary roof, it being impossible to distinguish the heat recovery features thereof.

Said roof modules have the appearance of standard tiles.

As regards the entire document, the term "tiles" may also be substituted for the term "roof module".

Outside the context of the invention, the term "roof module" is primarily preferred in that it makes it possible to emphasize the function of heat recovery from the solar radiation of the tiles.

In this document, the term "tile" has to be understood as including this function of heat recovery in addition to its usual meaning of roof elements.

The terms "roof module", tile, "heat recovery module", module or thermal tiles are used equally.

Thus, the roof according to the invention requires at least one solar radiation heat recovery module.

By way of non-limiting example, the number of tiles used to produce the roof will be high and easily exceed one hundred.

The heat recovery modules comprise on the underside at least one raised portion, also called a protrusion, characterized by a male protruding part designed to be interlocked in the heat transfer network. The term "protruding parts" is even more appropriate in terms of the female receiving part of the heat transfer network.

In contrast to standard protrusions, the protrusions located below the roof modules are not open on the inside and do not permit the passage of a commercial tubular network.

One of the advantages of the invention is to be able to use the roof modules fabricated in rigid, undeformable and inexpensive materials. Moreover, said modules may be produced by casting.

According to particular embodiments:
said tiles are cast from clay, a traditional material commonly denoted as terracotta after being fired.
numerous materials are able to be used to produce the tiles. By way of non-limiting example it is possible to cite glass, concrete, plastic materials, etc.
each roof module may comprise one or more protrusions on the underside.

The position of the protrusion is determined as a function of each type of tile and the desired heat recovery performances.

By way of example, it is possible to have a protrusion in the upper part of the tile which also ensures the behavioral function usually given to the tile studs and a second protrusion below the visible tile surface which is the part of the tile exposed to solar radiation.

According to one particular embodiment, with the use of pantiles and certain regional tiles the protrusion may be located on a plane parallel to the line of the slope on the underside of the tile; said protrusion located in the line of the slope will be advantageously located below the upper tile which directly receives the solar heat radiation.

According to a particular embodiment, the heat transfer network may be in the form of a conduit made of semi-flexible synthetic material of the reticulated polyethylene type "PER".

The heat transfer fluid present in the network and circulated permits all the usual uses of solar heat production to be met.

By way of example, this fluid may be used for the production of domestic hot water by a separate solar hot water heater "CESI" (Chauffe-Eau Solaire Individuel) or by the production of a combined solar system with a heated floor "SSC" (Système Solaire Combiné) or even to supply a heat pump "PAC" (Pompe à Chaleur) as the cold source, etc.

According to a particularly advantageous particular embodiment of the invention, a protruding profile located on the support arms retains the network, awaiting the installation of the roof modules.

This makes it possible to carry out the temporary positioning of the network before the installation of the modules. This is all carried out without specific tools by simple interlocking onto the support. More specifically, the profiles located on the arms permit the network to be temporarily coupled to the support.

In this particular embodiment, the network has at least two lateral grooves which interlock with the profiles located on the arms. Thus, the network is coupled temporarily to the support during installation.

This feature makes it possible to orient the longitudinal opening of the network and to hold it in a suitable position to receive the male protrusion of the module. More specifically, the two grooves located laterally on the network permit its rotation to be blocked.

This profile complements the basic functions of the support:
the sliding ensured by the sliding faces, permitting the installation of the heat transfer network between the arms either by the deflection of the arm(s) of the support or by the resilient deformation of the network.
the clamping ensured by the clamping faces which permits the tensioning of the network on the roof module and retention of the assembly.
the fixing of the recovery assembly to the roof frame using standard fixings traversing the base.

According to a further particular embodiment of the invention, the groove located on the heat transfer network has a roughened zone designed to increase the friction with the male protrusion of the roof modules.

By way of example, this groove may have raised portions of variable shapes and quantity. These raised portions are designed to improve the locking in position of the heat recovery protrusion located below the module.

They increase the friction of the groove with the module.

These raised portions reinforce the retention of the protrusion located below the module to avoid the detachment thereof.

According to particular embodiments, not illustrated, these raised portions have a surface reminiscent of fish scales. The retention of the protrusion of the tile inside the network is carried out according to a "sealskin" effect on an icy surface.

In addition, in order to complete the roof, the extremities of the roof structure: roof edge, ridge, flashing, eaves, hip rafters, skylights, etc. may be produced in the traditional manner which permits the network to pass through the underside and, in particular, the production of the expansion plates.

DETAILED DESCRIPTION

Figure 1:
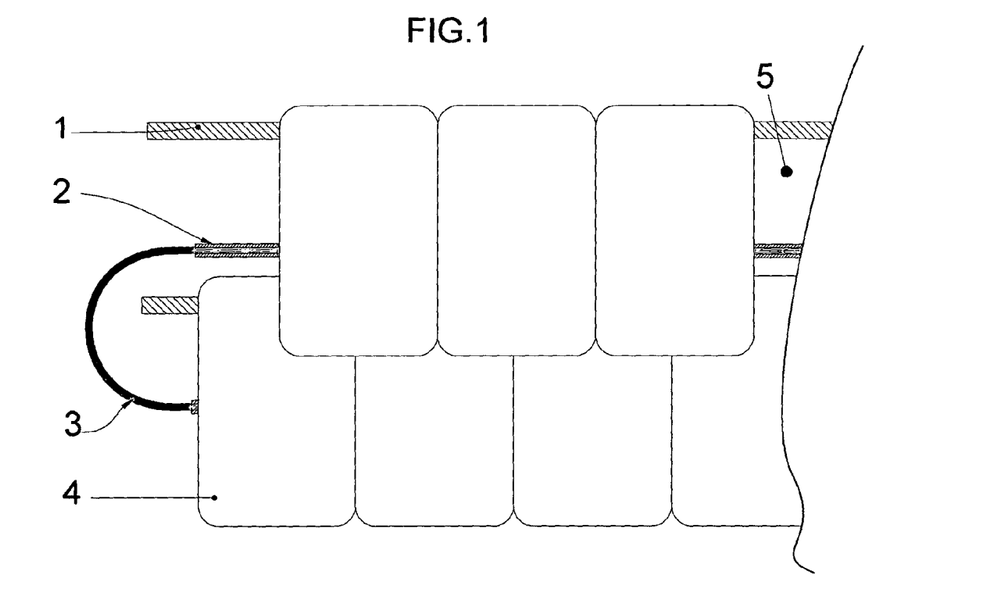
FIG. 1 shows a roof surface and the principle of heat recovery associated with a plurality of modules.

With reference to these drawings, I have shown in FIG. 1 a roof surface on which heat recovery modules (4) which have the appearance of standard plain tiles are arranged.

On this drawing, the external appearance of the roof is identical to that of a roof made of commercial plain tiles. As the roof surface is shown in the manner of a cutaway this permits different constituent elements of the invention to become apparent.

The support (2) is fixed to the roof frame (5) in the usual manner by a fixing such as a nail and receives the heat transfer network (3).

The roof module (4) is positioned on the batten (1) in the manner of standard plain tiles and the profile located on the underside and invisible in this figure transmits the heat from the solar radiation to the heat transfer network (3).

Figure 2:
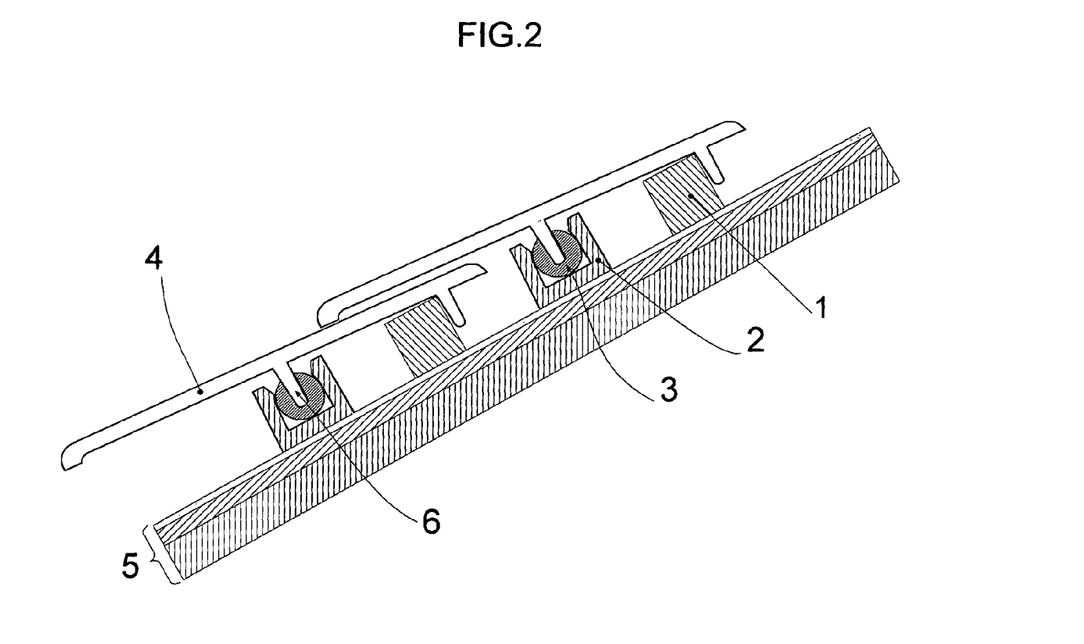
FIG. 2 shows a section of the heat recovery device according to the previous figure.

FIG. 2 shows the section of the roof surface according to FIG. 1 and permits different constituent elements of the invention to be distinguished. The heat recovery modules (4) have the male heat recovery protrusion (6) which transmits by conduction the heat captured by the heat recovery modules (4) from solar radiation to the heat transfer network (3). An opening in this network or longitudinal groove having a shape which is identical to that of the protrusion (6) of the module (4) remains in full contact due to the lateral tension exerted by the support (2).

Further conventional elements of the roof are shown in this figure: firstly, the roof frame (5), the different constituent parts thereof not being limiting and not constituting the subject of the invention. Secondly, the batten (1) for fixing at the top of the tile.

The standard fixing (7) which connects the support to the roof frame is not visible in this drawing; it is shown in the other figures.

Figure 3:
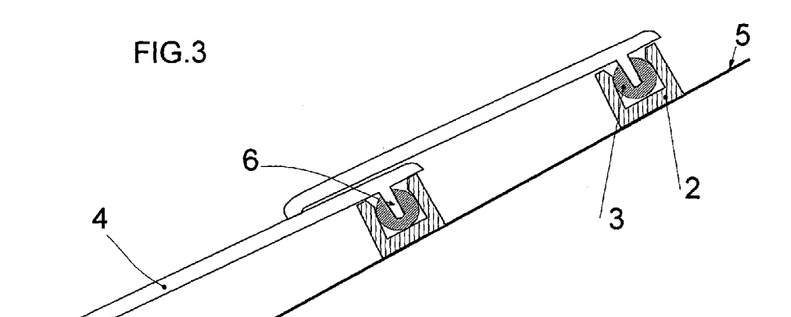
FIG. 3 shows a section of the heat recovery device located at the top of the tiles.

FIG. 3 constitutes an interesting variant of the invention. The protrusion (6), constituent element of the heat recovery module (4), is located in the upper part. Thus, the support (2) is substituted for the batten for fixing to the roof frame (5). As in the case of FIG. 2, the heat transfer network (3) is held in close contact with the protrusion (6) of the module (4) located on the underside due to the pressure exerted by the support (2).

Figure 4:
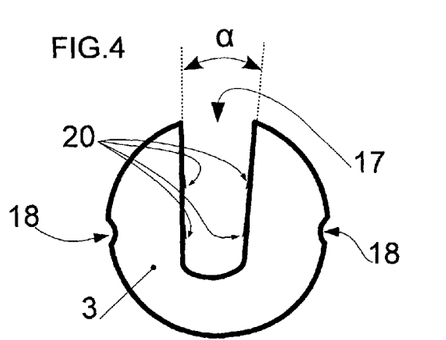
FIG. 4 shows the section of the heat transfer network.
Figure 7:
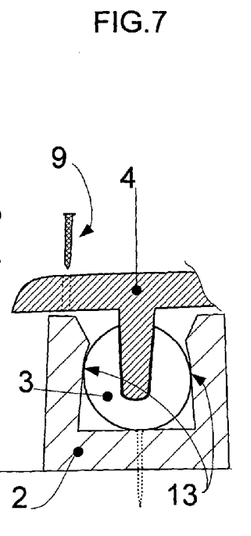
FIG. 7 shows the recovery device in the final position.

FIG. 4 shows the section of the network, in particular the important features of the invention. The network (3) is not a simple tubular conduit but has a specific profile. More specifically, its cylindrical appearance comprises an opening (17) of identical shape to the male part of the protrusion (6) located below the roof modules (4) of the other figures. The dimension may differ slightly, in particular to facilitate the insertion of the male profile therein. The contact is produced by the lateral external pressure exerted during mounting of this network inside the support (2) (see figures seven and ten). The female profile (17) then closes around the protrusion of the module in the manner of a clamp. The clamping corresponds to the reduction of the opening angle (α) of the groove of the network. This figure also shows two lateral grooves (18) designed to hold the tube (3) on the support, awaiting the installation of the heat recovery modules. These grooves (18) permit the pivoting of the tubular network (3) to be avoided during its installation. The network (3) may be integrally positioned, awaiting the positioning of the recovery modules from above. The grooves (18) interlock with the profile of the arms. Inside the female profile (17) are shown devices (20) which permit improved locking of the tile in position after it has been pushed in. This system which does not act against the tile being pushed in, operates as a genuine anti-return device.

Figure 5:
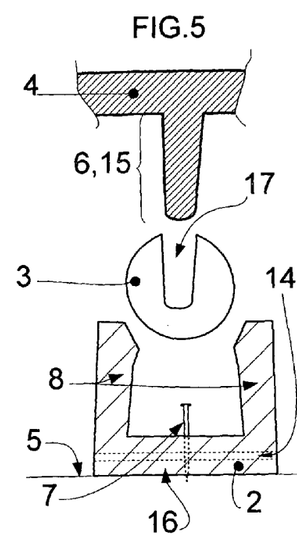
FIG. 5 shows in detail the recovery device before mounting.

FIG. 5 shows all of the basic components of the invention before mounting. Thus, the heat recovery modules (4) extended by the male part (15), merged in this case with the protrusion (6) on the underside, are shown. More specifically, the protrusion (6) located below the roof module (4) is fully protruding. Also, the heat transfer network (3) is visible, with the minimum features of the areas for receiving the protrusion (6). The support (2) which is fixed to the roof frame by means of a nail or a screw (7) consists of arms (8) positioned on both sides of the base (16).

In the base are drilled one or more venting orifices (14), designed to meet the requirements of renewing air on the underside of roofs according to current building regulations.

In the embodiment according to FIG. 5, the support (2) may consist of wood, the profile thereof being simple to produce by means of a spindle molder and the conventional tools of the carpenter; the network (3) may be produced in reticulated polyethylene from an extrusion mold which is specific to the innovation.

According to this particular embodiment, it is possible to use glycol-water as the heat transfer fluid, currently used to avoid the risk of ice in winter. The roof modules or tiles (4) may be produced by casting from the same constituents as standard tiles, namely clay, possibly comprising additives designed to modify the characteristics thereof.

Figure 6:
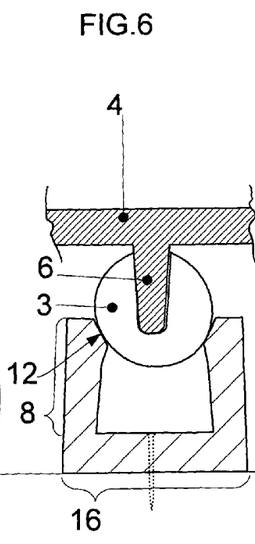
FIG. 6 shows the recovery device during the mounting phase.

FIG. 6 shows the installation of the roof module (4) by being pushed in. It presses on the network (3) by means of its protrusion (6). The network (3) bears against the sliding face (12). The network (3) has resilient characteristics, which permits its temporary deformation and its passage inside the arms (8) located on both sides of the base (16) of the support (2). The resilient qualities of the network (3) are sufficient for its insertion for final positioning in spite of the presence of fixed arms (8).

According to a variant, the arms (8) located on both sides of the support (2) may facilitate the insertion of the tube (3) by lateral flexion. The relatively thick arms in this drawing may also be reduced in thickness at their bases to permit or improve their flexion and the positioning of the tube. The lever arm which is greater at the top of the arms (8) facilitates the separation on both sides of the network (3) and the sliding of the network may be carried out so that it adopts its final position, as shown in the following figure.

FIG. 7 repeats, with a variant, the elements described in the preceding figure. The tile (4), the network (3), and the support (2) are shown in the final position. The support replaces the batten usually located at the top of the tiles. A standard fixing (9) such as a nail immobilizes the tile (4) permanently, which is already held due to its protrusion as a result of the lateral pressure exerted by the heat transfer network (3). This network in turn is held by the clamping faces (13) located between the arms of the support (2). The width of the clamping faces on both sides of the arms provides clamping over their upper part which holds the network (3) in the support (2).

FIG. 8 shows a further advantageous variant of the invention. The basic features are repeated and comprise improvements to facilitate the positioning and to increase the contact surface area between the roof module and its network. This figure shows the first step of installation on the roof. The support (2) is fixed to the roof frame (5) by a standard fixing such as a nail (7). The network (3) and the tile (4) are not yet positioned.

The protrusion (6) of the module (4) has an additional contact zone (21) in addition to the male protruding part (15).

This zone (21), when the heat recovery module (4) is pushed in, is positioned in contact with the heat transfer network (3) around the tubular periphery of the network and permits the contact surface area to be increased. This feature is particularly advantageous, on the one hand, to distribute the bearing pressure widely in order to push in the module (4) without breakage inside the support (2) and, on the other hand, to increase the heat exchange surface between the network (3) and the tile (4). The two arms (8) located on both sides of the base comprise profiles (10). Said profiles permit, when positioned, the retention of the heat transfer network (3) awaiting the reception of the roof modules (4), as the following figure shows.

FIG. 9 repeats the previous view and shows the heat transfer network in its waiting position. The heat transfer network (3) is pushed in manually by the installer as indicated by the double arrow. This forces the arms (8) to separate by flexion, in the direction indicated by the two arrows (A). The resilience of the network also contributes to this positioning. The network (3) comprises grooves (18) which enable it to be kept locked in an intermediate position without permitting the rotation thereof. The profile (10) located on the arm (8) complements the sliding faces (12) and clamping faces (13). The profile (10) interlocks with the grooves (18) of the heat transfer network (3). The installer could use a wooden wedge arranged in the groove (not shown) to push the network (3) into its waiting position.

The groove (17) is awaiting the reception of the male profile (15) located on the protrusion (6) of the module (4) which will complete the positioning as indicated in FIG. 10. The roofer is able to carry out the full positioning of the heat transfer network (3) before the arrival of the heat recovery modules (4) on site.

FIG. 10 shows the section of the mounted assembly of the invention. The heat recovery module (4) has been pushed into the heat transfer network (3). The two arms (8) located on both sides of the support are tightened and maintain a lateral clamping force exerted by the clamping face (13) on the heat transfer network (3). The heat conduction is implemented inside the network (3) itself by the perimeter of the protrusion being in contact with the network when the module (15) is pushed in. Added to this heat transmission is that implemented outside the network by contact with the heat recovery protrusion (21).

The support (2) also has a base (16) extended outside the arms (8). The standard fixing (7) may thus be placed in a different manner from that in the two preceding views. This advantageous feature permits, amongst other things, to facilitate the installation of the support on the roof frame and, in particular, to avoid damaging the arms (9) when installing the fixing by a tool, such as a hammer.

Figure 11A:
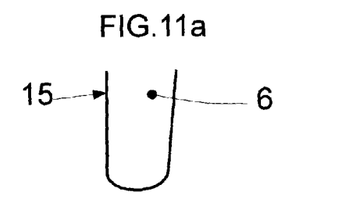
FIGS. 11a and 11b show the sections in contact between the protrusion of the module and the network.
Figure 11B:
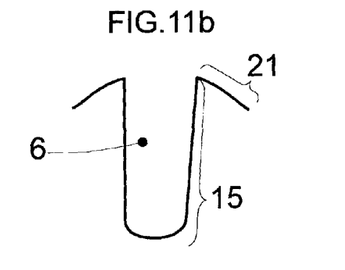

FIG. 11 shows the specific profile of the protrusion for heat recovery (6) located below the roof module (4).

This protrusion for heat recovery comprises a male part (15) designed to be inserted into the heat transfer network. In FIG. 11b, this protrusion also comprises a perimeter for external transmission (21) as a complement to the heat recovery carried out inside the heat recovery network (15). This permits the contact surface between the module and the network to be increased, and as a result the heat exchange.

Figure 12:
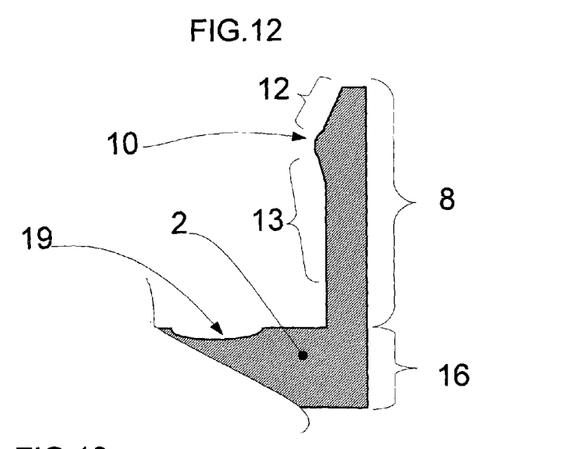
FIG. 12 shows a part of the support which illustrates its different constituent parts.

FIG. 12 shows the partial section of the support in this particularly advantageous embodiment designed to receive the assembly for heat recovery. This section makes it possible to detail different functions of the support. The sliding face (12) permits the arms of the support (8) to be separated during the insertion of the network. The sliding face (12) also permits the resilient compression of the heat transfer network during its installation.

The profile (10) permits said heat transfer network waiting for the installation of tiles to be retained. Said profile (10) is designed to be interlocked in the groove (18) of the heat transfer network (3) (see FIG. 4).

Finally, during the definitive insertion of the tiles in their support, the arm of the support (8) flexes again to permit the heat transfer network (3) to be detached from the profile (10) and to be lowered into the final position.

The clamping face (13) carries out the tensioning of the heat transfer network when the module is pushed in. A cradle (19) located in the base (16) of the support receives the network and permits the lateral dimensions of the support (2) to be optimized. Insulating materials, not shown, may also be inserted at this position (19), in order to ensure an effective rupture of the thermal bridge toward the roof frame.

According to a variant, not shown, the cradle may consist of an attached part protruding on the base of the support (2).

Figure 13:
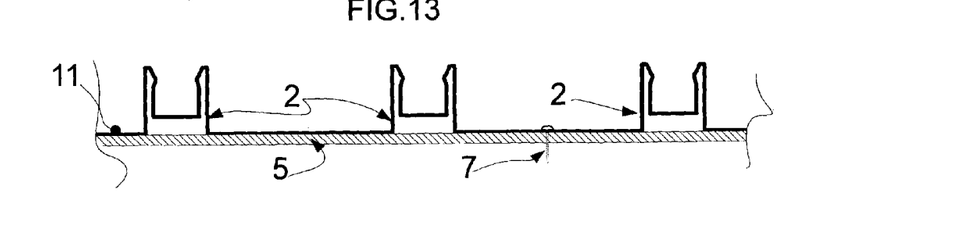
FIG. 13 shows the section of supports integrated in a metal roof deck.

FIG. 13 illustrates a variant of the innovation. The supports (2) are produced using a stamped metal sheet. The supports of the modules are fixed and form a roof deck (11). The illustration shows these supports produced using the same stamped metal sheet positioned on the roof frame (5). A standard fixing (7) fixes the assembly to the roof frame.

The invention is particularly intended for producing attractive roofs including the recovery of heat from solar radiation. The invention makes it possible to facilitate its implementation and increase heat output.

Moreover, this invention is also used to implement the recovery of heat from solar radiation in a cost-effective manner, reducing the use of additional materials when producing roofs.

The invention is in accordance with the duty of citizens to reduce the consumption of fossil fuels and to act responsibly regarding natural resources.

The invention claimed is:

1. A tiled roof of standard appearance comprising a solar radiation heat recovery device that is invisible from the outside, said roof comprising, on the one hand, at least one solar radiation heat recovery module and, on the other hand, at least one support of a heat transfer network, said heat recovery module comprising on the underside at least one raised portion or protrusion, said support designed for fixing the network and the modules to a frame of the roof comprising a base extended by arms located in mutual opposition, comprising at least one area in the base designed for a passage of standard fixings toward the roof frame, wherein the support comprises arms in mutual opposition, each incorporating two faces: a sliding face which permits the passage of the network inside the support, and a clamping face, the lateral pressure thereof being exerted on the network, wherein the protrusion comprises a male protruding part designed to be interlocked in the heat transfer network, wherein the network comprises a longitudinal groove having a shape which is identical to the protruding part of the protrusion of the heat recovery modules, wherein the flexibility of the network permits the tightening of said groove about the male protruding part of the protrusion and the fixing of the modules to the support, and wherein when the network is pushed in by the installer, the lateral pressure exerted by the clamping faces of the support located in opposition transmits a pressure to the network which tightens the groove thereof, when applied onto the male protrusion located below the roof modules.

2. The roof as claimed in claim 1, wherein the protrusion of the heat recovery module comprises a lateral contact surface and bearing surface designed to improve the heat exchange between the modules and the network and to facilitate the distribution of the bearing pressure when the modules are pushed in.

3. The roof as claimed in claim 1, wherein a protruding profile located on the support arms retains the network, awaiting the installation of the roof modules, further characterized by the network which has at least two lateral grooves which interlock with the profiles located on the arms permitting the network to be temporarily coupled to the support during installation.

4. The roof as claimed in claim 1, wherein at least one of the arms of the support comprises a flexion zone designed to facilitate the insertion of the network by being deflected laterally at the time of its installation by a roofer.

5. The roof as claimed in claim 1, wherein the groove located on the heat transfer network has a roughened zone designed to increase the friction with the male protrusion of the roof modules.

6. The roof as claimed in claim 1, wherein the support(s) are integrated in a roof deck.

\* \* \* \* \*